United States Patent
Chen et al.

(10) Patent No.: US 7,252,350 B2
(45) Date of Patent: Aug. 7, 2007

(54) PEDESTAL ASSEMBLY FOR COMPUTER ENCLOSURES

(75) Inventors: Hsuan-Tsung Chen, Tu-Chen (TW); Ying Sin William Tin, Shenzhen (CN); Pin-Shian Wu, Tu-Chen (TW); Peng Liu, Shenzhen (CN)

(73) Assignees: Hong Fu Jin Precision Ind. (Shenzhen) Co., Ltd., Shenzhen (CN); Hon Hai Precision Ind. Co., Ltd., Tu-Cheng (TW)

( * ) Notice: Subject to any disclaimer, the term of this patent is extended or adjusted under 35 U.S.C. 154(b) by 330 days.

(21) Appl. No.: 10/946,720

(22) Filed: Sep. 21, 2004

(65) Prior Publication Data

US 2005/0150435 A1    Jul. 14, 2005

(30) Foreign Application Priority Data

Dec. 26, 2003    (TW) .............................. 92222768 U

(51) Int. Cl.
*A47B 81/00*    (2006.01)
(52) U.S. Cl. .............................. 312/223.2; 312/351.3; 248/188.8; 248/346.01; D14/352
(58) Field of Classification Search ............ 312/223.1, 312/223.2, 351.1, 351.3, 351.8; 248/188, 248/188.1, 188.8, 676, 677, 688, 346.01, 248/346.07; 361/679, 683, 724; 108/85, 108/87; D14/352
See application file for complete search history.

(56) References Cited

U.S. PATENT DOCUMENTS

| | | | | |
|---|---|---|---|---|
| 5,020,768 A | * | 6/1991 | Hardt et al. ................. | 348/678 |
| 5,470,042 A | * | 11/1995 | Fietz et al. .................. | 248/678 |
| 5,823,644 A | * | 10/1998 | Suh et al. ................. | 312/223.2 |
| 5,826,922 A | * | 10/1998 | Wernig ........................ | 292/39 |
| 6,311,941 B1 | * | 11/2001 | Feldmeyer ............... | 248/188.8 |
| 6,364,278 B1 | | 4/2002 | Lin et al. | |
| 6,419,198 B1 | * | 7/2002 | Einav .................... | 248/346.07 |

FOREIGN PATENT DOCUMENTS

CN    95211103.9    9/1996

* cited by examiner

Primary Examiner—James O. Hansen
Assistant Examiner—Philip Gabler
(74) Attorney, Agent, or Firm—Wei Te Chung

(57) ABSTRACT

A pedestal assembly (20) includes a chassis (200), a gear wheel (300) pivotably mounted to the chassis, two supporting members (400) coupled to the chassis, and a coil spring (500) received between the chassis and the gear wheel. The chassis includes a stop portion (222) depending downwardly from a side of a top wall (210) thereof. The gear wheel includes first teeth (330) extending from a periphery thereof. Each supporting member includes a rack (440) comprises second teeth (444) engaging with the first teeth, and a first clasping portion (448) formed on an outer side thereof. When one of the first clasping portions is locked by the stop portion, the coil spring is compressed, while when the first clasping portion is unlocked from the stop portion, the coil spring is decompressed and drives the gear wheel to rotate to cause the supporting members to move relative to the gear wheel.

22 Claims, 4 Drawing Sheets

PEDESTAL ASSEMBLY FOR COMPUTER ENCLOSURES

BACKGROUND OF THE INVENTION

1. Field of the Invention

The present invention relates to a pedestal assembly for computer enclosures, and particularly to an adjustable pedestal assembly for computer enclosures.

2. Description of the Related Art

Conventional desktop computer enclosures are usually classified as tower computer enclosures and horizontal computer enclosures. Due to a compact size trend of the development of computer enclosures, horizontal computer enclosures are made much thinner than the tower computer. To enable a horizontal computer enclosure to stand like a tower computer enclosure, a supporting apparatus, such as a pedestal is needed.

U.S. Pat. No. 6,364,278 discloses a pedestal designed to meet the above need. The pedestal includes a first supporting member and a second supporting member coupled together. The first supporting member includes a first top wall and a first ledge extending from the first top wall. The first top wall forms a first coupling wall and a first protrusion extending from the first coupling wall. A first recess is defined in the first top wall and exposed to the first coupling wall. The second supporting member includes a second top wall and a second ledge extending from the second top wall. The second top wall forms a second coupling wall for coupling to the first coupling wall and a second protrusion extending from the second coupling wall to be engagingly received in the first recess of the first supporting member. A second recess is defined in the top wall and exposed to the second coupling wall for engagingly receiving the first protrusion of the first supporting member. The second ledge is spaced from the first ledge to cooperatively receive a computer enclosure therebetween.

The assembly of the first and second supporting members is simple. However, the assembled first and second supporting members is not adjustable after coupled, thus in the case of accommodated space for the computer enclosure is limited, said pedestal is unusable.

China Pat. No. ZL95211103.9 discloses a kind of adjustable pedestal, which includes a body and two supporting portions. A recess is formed respectively at opposite ends of the body, with a post respectively protruding therefrom. The supporting portions are pivotably secured to the body by the posts. The supporting portions can be adjusted freely according to different space allowed. However, each supporting portion must be adjusted separately and respectively, which is unduly cumbersome and time consuming.

Thus an improved pedestal assembly which overcomes the above-mentioned problems is desired.

BRIEF SUMMARY OF THE INVENTION

Accordingly, an object of the present invention is to provide a pedestal assembly which provides steady and adjustable supporting means for computer enclosures.

To achieve the above-mentioned objects, a pedestal assembly for a computer enclosure comprises a chassis mounted to the computer enclosure, a gear wheel, a coil spring, and a pair of supporting members. The chassis comprises a top wall. A stop portion depends from a side of the top wall. The gear wheel is pivotably mounted to the chassis, and comprises a plurality of first teeth extending outwardly from a periphery thereof. The coil spring is received between the gear wheel and the chassis. Each of the supporting members is coupled to the chassis, and comprises a rack. The rack comprises a plurality of second teeth formed on an inner side thereof, and a first clasping portion formed on an outer side thereof. The second teeth of the supporting member engage with the first teeth of the gear wheel. When the first clasping portion of one of the supporting members is locked by the stop portion of the chassis, the coil spring is compressed and the supporting members are in respective first positions, while when the first clasping portion is unlocked from the stop portion, the coil spring is decompressed and drives the gear wheel to rotate. The gear wheel drives the supporting members to move to respective second positions.

Other objects, advantages and novel features of the present invention will be drawn from the following detailed description of a preferred embodiment of the present invention with the attached drawings, in which:

DETAILED DESCRIPTION OF THE INVENTION

The present invention will be described in its preferred embodiment in conjunction with a bottom portion of a computer enclosure. The preferred embodiment comprises a pair of adjustable pedestal assemblies for supporting the computer enclosure. Because the two pedestal assemblies are substantially identical, only one of them will be described below.

Figure 1:
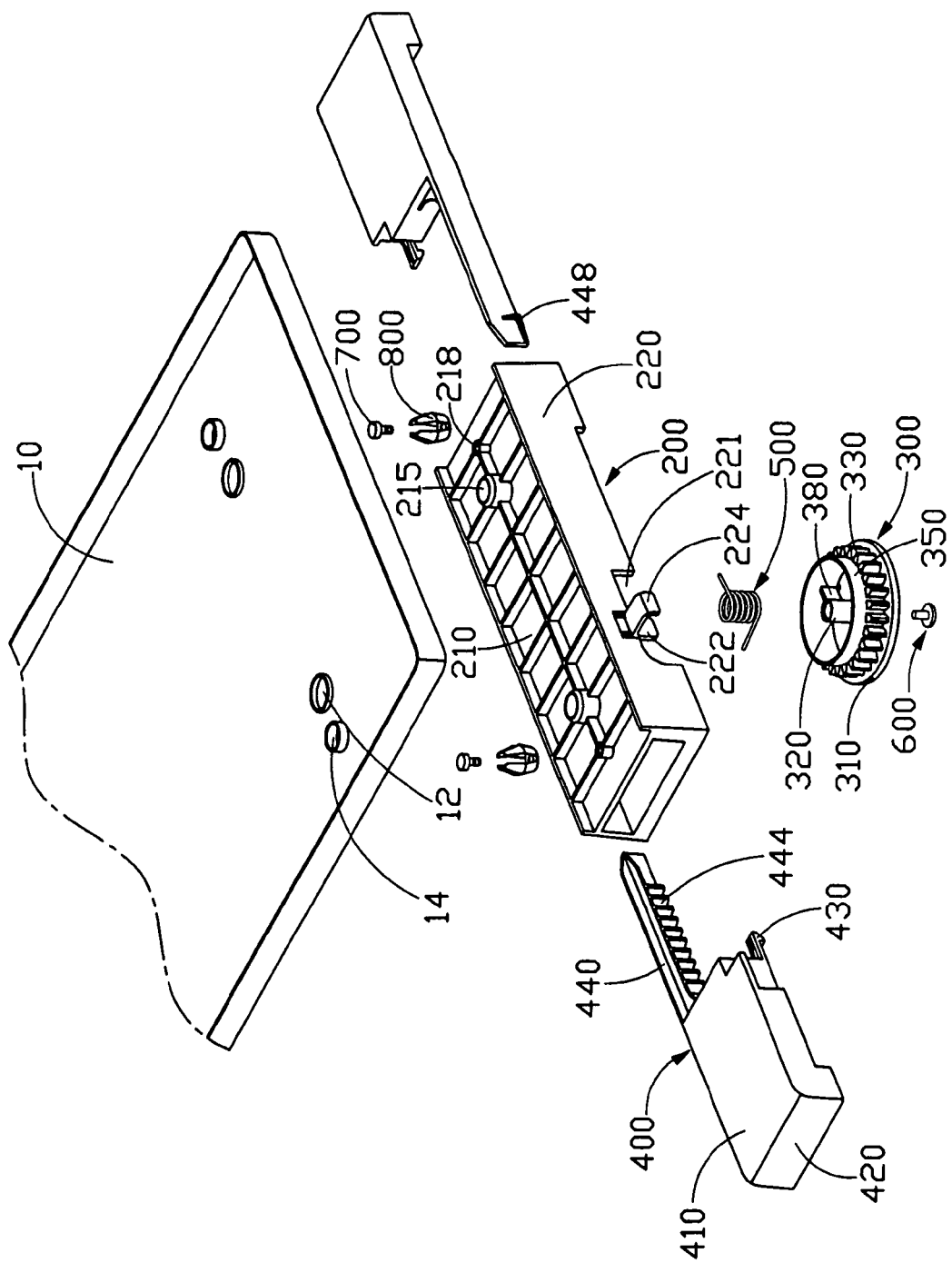
FIG. 1 is an exploded, isometric view of a pedestal assembly in accordance with the preferred embodiment of the present invention, together with a bottom portion of a computer enclosure.

FIG. 1 shows an adjustable pedestal assembly 20 (labeled in FIG. 3) of the present invention in conjunction with a bottom portion 10 of a computer enclosure. The pedestal assembly 20 comprises a chassis 200 mounted to the bottom portion 10, a gear wheel 300 pivotably coupled to the chassis 200, a pair of supporting members 400, and a coil spring 500 received between the chassis 200 and the gear wheel 300.

The bottom portion 10 comprises a pair of separate through holes 12 defined in two opposite ends thereof, and two pairs of mounting holes 14 adjacent to the holes 12 respectively.

Figure 2:
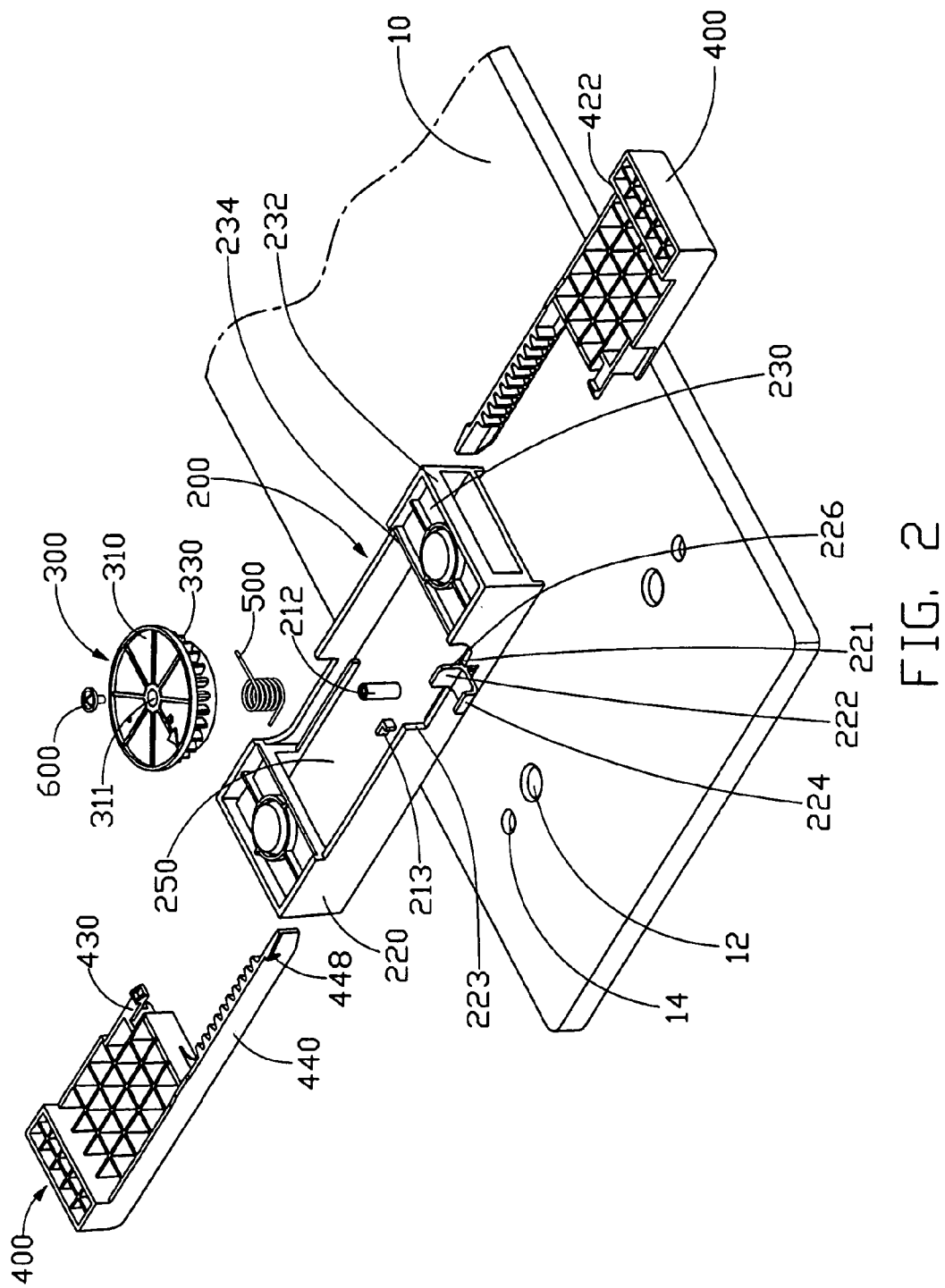
FIG. 2 is an inverted view of FIG. 1.

Referring also to FIG. 2, the chassis 200 comprises a rectangular top wall 210, a pair of sidewalls 220 depending from opposite longer edges of the top wall 210, and a pair of bottom walls 230. Each bottom wall 230 interconnects bottom portions of opposite ends of the two sidewalls 220. The two sidewalls 220, the top wall 210, and the two bottom walls 230 bound an opening 250 (or receiving the gear wheel 300 and the supporting members 400. The top wall 210 defines a pair of hollow locating posts 215 and a pair of threaded holes 218 in a top face thereof. The locating posts 215 are corresponding to the holes 12 of the bottom portion 10, and the threaded holes 218 are corresponding to the mounting holes 14. A pair of resilient claws 800 is retained in the threaded holes 218 by two screws 700 respectively. A pivot axis 212 depends from a center of a bottom surface of the top wall 210. A threaded hole (not labeled) is defined in a center of the pivot axis 212. A first locating portion 213 protrudes from the top wall 210 adjacent to the pivot axis 212. Each sidewall 220 has a cutout 221 defined in an end thereof, the cutout 221 proximate to the bottom wall 230. Each sidewall 220 comprises a stop side 223 at a side of each cutout 221 adjacent to the pivot axis 212. A stop portion 222 protrudes from one of the two cutouts 221, adjacent to one of the bottom walk 230. The stop portion 222 comprises a side 226 adjacent to said bottom wall 230. An L-shaped handle 224 extends outwardly from a middle of the stop portion 222, for facilitating operating the stop portion 222. Each bottom wall 230 comprises an outer side 232, and an inner side 234 opposite to the outer side 232.

The gear wheel 300 is received in the opening 250 of the chassis 200, and comprises a circular disk 310. A circular receiving hole 311 is defined in a center of the disk 310. A small first cylinder 320 extends upwardly from the center of the disk 310, for receiving the pivot axis 212 of the chassis 200. A second locating portion 380 is formed in the disk 310, adjacent to the first cylinder 320. A great second cylinder 350 protrudes upwardly from the disk 310, proximate to the second locating portion 380. The first and second cylinders 320, 350 are coaxial. The second cylinder 350 surrounds the first cylinder 320 and the second locating portion 380. A plurality of separate first teeth 330 extends outwardly from a periphery of the second cylinder 350.

The supporting members 400 are attached to the chassis 200, and engage with the gear wheel 300. Each supporting member 400 comprises a main body 410, a base 420 depending from an end of the main body 410, and a longitudinal rack 440 extending from an outer side of the other end of the main body 410. The base 420 has an inner side portion 422. A plurality of separate second teeth 444 is formed on an inner side of the rack 440, engaging with the first teeth 330 of the chassis 300. A first clasping portion 448 is fabricated on a bottom of an outer side of the rack 440. A second clasping portion 430 extends from the main body 410, parallel to the rack 440 and opposite to the base 420. The first and second clasping portions 448, 430 cooperatively prevent the supporting member 400 from disengaging from the chassis 200.

Figure 3:
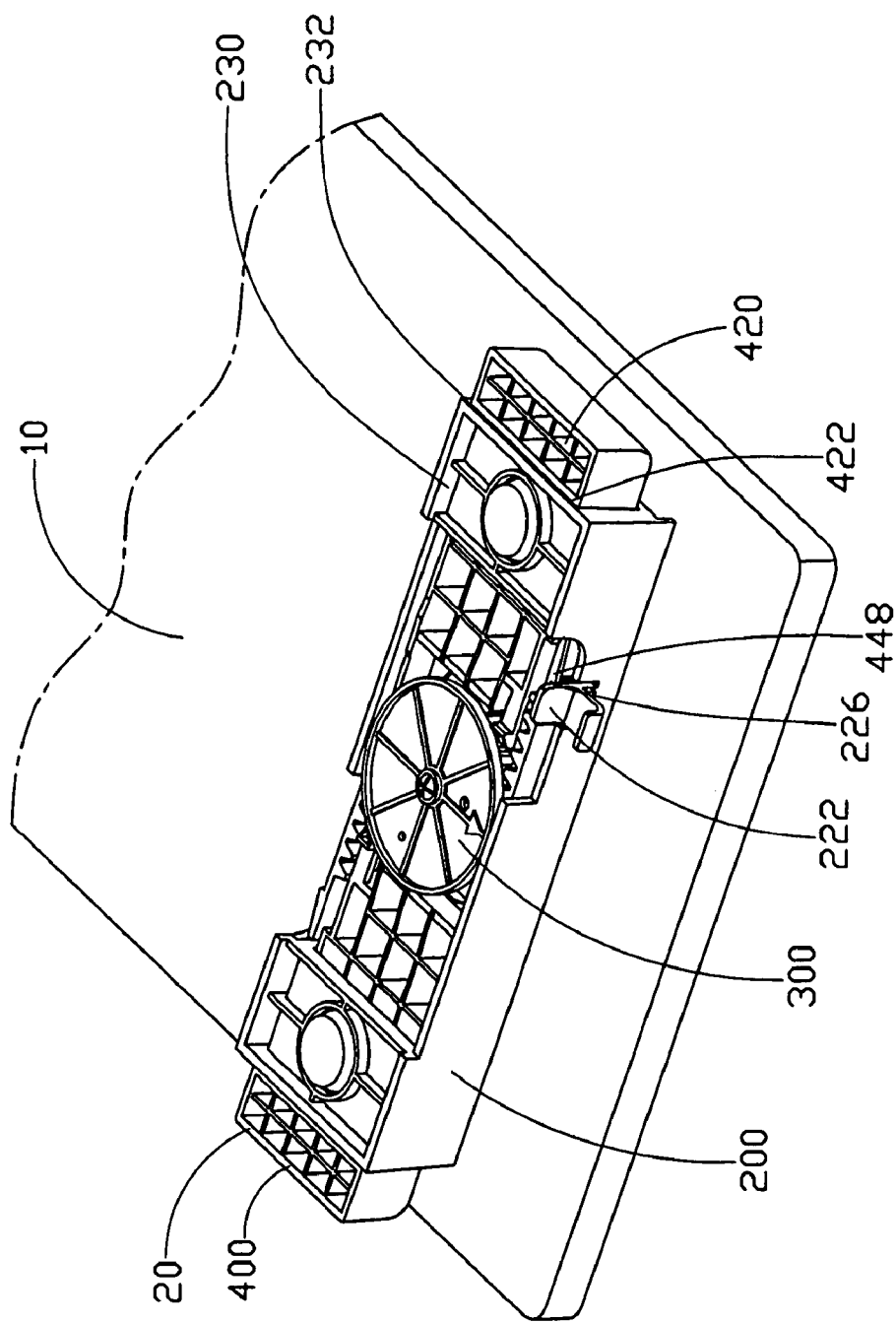
FIG. 3 is an assembled view of FIG. 2, showing the pedestal assembly in a closed position.
Figure 4:
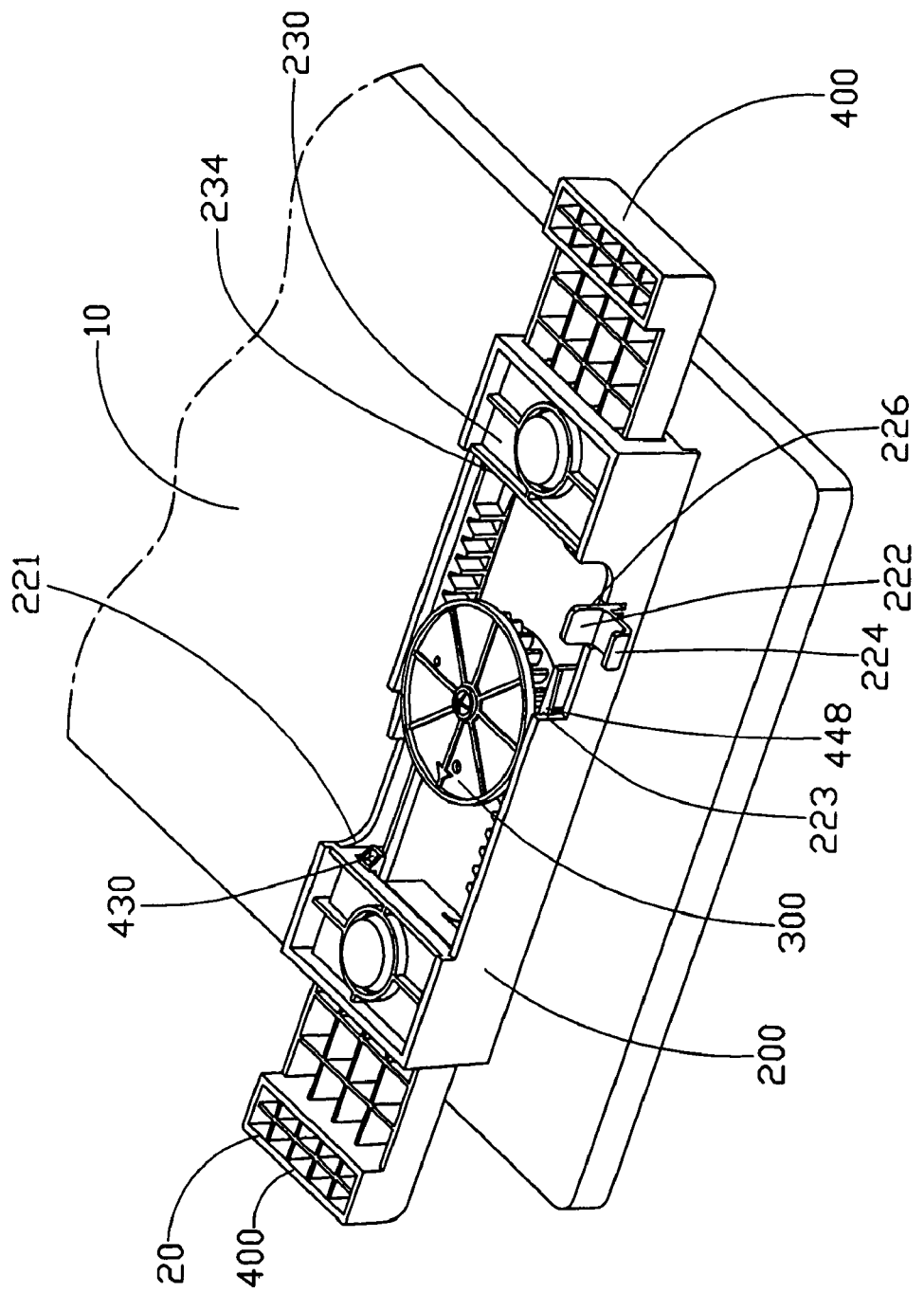
FIG. 4 is similar to FIG. 3, but showing the pedestal assembly in an open position.

Referring also to FIGS. 3 and 4, in assembly, the rack 440 of each supporting member is received in the opening 250 of the chassis 200. After the coil spring 500 is disposed around the first cylinder 320 of the gear wheel 300, the gear wheel 300 is mounted to the chassis 200 with a pair of opposite distal ends (not labeled) of the coil spring 500 abutting against the first locating portion 213 of the chassis 200 and the second locating portion 380 of the gear wheel 300 respectively. Simultaneously, the first teeth 330 of the gear wheel 300 engage with the second teeth 444 of each supporting member 400. A screw 600 is threadedly mounted to the threaded hole of the pivot axis 212 via the receiving hole 311 of the gear wheel 300. Thus, the gear wheel 300 is pivotably coupled to the chassis 200. The posts 215 of the chassis 200 are received in the holes 12 of the bottom portion 10 respectively, and the resilient claws 800 are received in the mounting holes 14 of the bottom portion 10 respectively. The pedestal assembly 20 is thereby mounted to the bottom portion 10. After assembly, outer surfaces of the bottom walls 230 of the chassis 200 and the bases 420 of the supporting members 400 flush with each other.

Referring particularly to FIG. 3, the pedestal assembly 20 is in a closed position. In the closed position, the supporting members 400 are defined to be in respective first positions. In the first position, the first clasping portion 448 of one of the supporting members 400 is locked by the side 226 of the stop portion 222 of the chassis 200, thus said supporting member 400 is locked in the first position. Simultaneously, the coil spring 500 (referring to FIG. 1)is compressed, and the inner side portions 422 of the bases 420 or the supporting members 400 abut against the outer sides 232 of the bottom walls 230 of the chassis 200 respectively. Because said supporting member 400 is locked in the first position, the gear wheel 300 can not rotates. Therefore, the other supporting member 400 is locked in the first position too.

Referring particularly to FIG. 4, in use, the pedestal assembly 20 is oriented in an open position. When the first clasping portion 448 is unlocked from the side 226 of the stop portion 222 of the chassis 200 by operating the handle 224 of the stop portion 222, the coil spring 500 (referring to FIG. 1) is decompressed and drives the gear wheel 300 to rotate. Simultaneously, the gear wheel 300 drives the supporting members 400 to move away from the gear wheel 300 to respective second positions. In the second positions, the first clasping portions 448 of the supporting members 400 are stopped by the stop sides 223 of the corresponding cutout 221 of the chassis 200 respectively, and the clasping portions 430 of the supporting members 400 are stopped by the inner sides 234 of the bottom walls 230 of the chassis 200 respectively. Therefore, the supporting members 400 cannot be divorced from the chassis 200 freely. When an operator (not shown) drives one of the supporting members 400 to move close to the gear wheel 300, the gear wheel 300 rotates and the other supporting member 400 also moves close to the gear wheel 300. Therefore, the supporting members 400 move back from the second positions to the first positions.

The coil spring 500 of the pedestal assembly 20 can be replaced by other resilient members (not shown). The pedestal assembly 20 may not comprise the coil spring 500, and the operator drives the pedestal assembly 20 to move from the closed position to the open position instead of the coil spring 500.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A pedestal assembly for supporting a computer enclosure, the pedestal assembly comprising:
    a chassis mounted to a bottom plate of the computer enclosure and underlying the bottom plate of the computer enclosure;
    a gear wheel pivotably attached to the chassis, the gear wheel comprising a plurality of first teeth extending outwardly from a periphery thereof;
    a pair of supporting members coupled to the chassis, each of the supporting members comprising a rack, and a base located at a bottommost of the computer enclosure for being supported on a plane to stably balance the computer enclosure, the rack comprising a plurality of second teeth for engaging with the first teeth; wherein
    when one of the supporting members moves relative to the gear wheel, the gear wheel is rotated and drives the other supporting member to move relative to the gear wheel.

2. The pedestal assembly as described in claim 1, wherein the chassis comprises a top wall mounted to the bottom plate of the computer enclosure, a pair of sidewalk depending from opposite sides of the top wall, and a pair of bottom walls each interconnecting bottom portions of opposite ends of the sidewalls, the top wall, the sidewalls and the bottom walls bounding an opening for receiving the gear wheel and the supporting members.

3. The pedestal assembly as described in claim 2, wherein each of the sidewalk defines a cutout adjacent to a respective bottom wall.

4. The pedestal assembly as described in claim 2, wherein the top wall comprises a pivot axis extending downwardly from a bottom surface thereof.

5. The pedestal assembly as described in claim 4, wherein the gear wheel comprises a disk, a first cylinder extends upwardly from a center of the disk, the pivot axis of the chassis is received in the first cylinder.

6. The pedestal assembly as described in claim 5, wherein a second cylinder extends upwardly from the disk, the first cylinder and the second cylinder are coaxial, the first teeth extend outwardly from a periphery of the second cylinder.

7. The pedestal assembly as described in claim 1, wherein each of the supporting members further comprises a main body, and the base depending from an end of the main body, the rack extends from the other end of the main body.

8. The pedestal assembly as described in claim 7, wherein a clasping portion extends from the other end of the main body of each of the supporting members, and is parallel to the corresponding rack.

9. The pedestal assembly as described in claim 8, wherein another clasping portion is formed on an outer side of the rack of each of the supporting members, and the second teeth are formed on an inner side of the rack or each of the supporting members, said clasping portion and said another clasping portion of each of the supporting members cooperatively prevent the corresponding supporting member from disengaging disengaging from the chassis.

10. A pedestal assembly for supporting a computer enclosure, the pedestal assembly comprising:
a chassis mounted to a bottom plate of the computer enclosure, the chassis comprising a top wall underlying the bottom plate of the computer enclosure, the top wall comprising a stop portion depending from a side thereof;
a gear wheel pivotably mounted to the chassis, the gear wheel comprising a plurality of first teeth extending outwardly from a periphery thereof;
a coil spring received between the gear wheel and the chassis;
a pair of supporting members coupled to the chassis, each of the supporting members comprising a rack, and a base cooperative with the chassis supported on a plane to support the computer enclosure thereon, the rack comprising a plurality of second teeth engaging with the first teeth of the gear wheel and a first clasping portion being lockable with the stop portion directly;
wherein when the first clasping portion of one of the supporting members is locked with the stop portion of the chassis, the coil spring is compressed and the bases of the supporting members are in respective first positions, while when the first clasping portion is unlocked from the stop portion, the coil spring is decompressed and drives the gear wheel to rotate to cause the supporting members to move with the bases of the supporting members moving away from the chassis to respective second positions where the bases extend to outside of the bottom plate of the computer enclosure and the first clasping portion is locked with the chassis and unlockable with the stop portion.

11. The pedestal assembly as described in claim 10, wherein the chassis comprises a pair of sidewalls depending from opposite sides of the top wall, a pair of bottom walls each interconnecting opposite bottom end of the sidewalls, and an opening bounded by the sidewalls, the bottom walls and the top wall, the opening for receiving the gear wheel and the supporting members.

12. The pedestal assembly as described in claim 11, wherein each of the sidewalls define a cutout adjacent to a, corresponding bottom wall, and the stop portion protrudes from one of the cutouts, a handle portion extends outwardly from the stop portion.

13. The pedestal assembly as described in claim 11, wherein a first locating portion protrudes from a bottom surface of the top wall, a second locating portion protrudes from a bottom surface of the gear wheel, the coil spring abuts against the first and second locating portions.

14. The pedestal assembly as described in claim 10, wherein a pivot axis protrudes from a bottom surface of the top wall.

15. The pedestal assembly as described in claim 14, wherein the gear wheel comprises a disk defining a receiving hole in a center thereof, a first cylinder depending upwardly from the center of the disk for receiving the pivot axis of the chassis.

16. The pedestal assembly as described in claim 15, wherein the coil spring is disposed around the first cylinder of the gear wheel.

17. The pedestal assembly as described in claim 15, wherein a second cylinder extends upwardly from the disk, the first cylinder and the second cylinder are coaxial, the first teeth extend outwardly from a periphery of the second cylinder.

18. The pedestal assembly as described in claim 10, wherein each of the supporting members comprises a main body, and a base depending from an end of the main body, the rack extends horizontally from the other end of the main body.

19. The pedestal assembly as described in claim 18, wherein the second teeth are formed on an inner side of the rack of each of the supporting members, and the first clasping portion is farmed on an outer side of the rack of each of the supporting members.

20. The pedestal assembly as described in claim 18, wherein a second clasping portion extends from the other end of the main body of each of the supporting members and is parallel to the corresponding rack, the first clasping portion and the second clasping portion of each of the supporting members cooperatively preventing the corresponding supporting member from disengaging from the chassis.

21. A computer assembly comprising:
an enclosure defining a bottom plate with long and short dimensions respectively along lengthwise and lateral directions perpendicular to each other;
a chassis mounted to the bottom plate configured for supporting the enclosure thereon;
a gear center attached to the chassis, the gear center comprising a plurality of first teeth extending outwardly from a periphery thereof;
a pair of supporting members coupled to the chassis, each of the supporting members comprising a rack, and a base extending to outside of the chassis in the lateral direction the rack comprising a plurality of second teeth for engaging with the first teeth; wherein when the gear center respectively engages both said pair of supporting members so as to allow the pair of supporting members to be retracted in an inner position where the supporting members do not extend out of a periphery of the bottom plate, or be extended in an outer position where the supporting members extend out of the periphery of the bottom plate, under a condition that both said gear center and said pair of supporting members are synchronically moveable wit each other, in the outer position the bases of said pair of supporting members extend out of long edges of the bottom plate to increase the short dimension along the lateral direction, and to cooperate with the chassis to stably support the enclosure thereon.

22. The assembly as claimed in claim 21, wherein a spring member mounted between the chassis and the ear center, for urging the supporting members to the outer position.

* * * * *